United States Patent
Forbes

(10) Patent No.: US 10,769,933 B2
(45) Date of Patent: Sep. 8, 2020

(54) SAFETY WEARABLE DEVICE

(71) Applicant: Iris Forbes, Bridgeport, CT (US)

(72) Inventor: Iris Forbes, Bridgeport, CT (US)

( * ) Notice: Subject to any disclaimer, the term of this patent is extended or adjusted under 35 U.S.C. 154(b) by 0 days.

(21) Appl. No.: 16/258,655

(22) Filed: Jan. 27, 2019

(65) Prior Publication Data

US 2020/0242914 A1 Jul. 30, 2020

(51) Int. Cl.
*G08B 25/01* (2006.01)
*G06F 3/01* (2006.01)
*G06F 1/16* (2006.01)
*G08B 21/02* (2006.01)

(52) U.S. Cl.
CPC ........... *G08B 25/016* (2013.01); *G06F 1/163* (2013.01); *G06F 3/014* (2013.01); *G08B 21/0205* (2013.01)

(58) Field of Classification Search
None
See application file for complete search history.

(56) References Cited

U.S. PATENT DOCUMENTS

| | | | | |
|---|---|---|---|---|
| 9,939,784 B1* | 4/2018 | Berardinelli | ....... | G04B 37/1486 |
| 10,175,654 B2* | 1/2019 | Berardinelli | ........... | G04G 21/02 |
| 2010/0311384 A1* | 12/2010 | Brayton | ............... | G08B 25/009 |
| | | | | 455/404.1 |
| 2016/0049569 A1* | 2/2016 | Negrin | .................... | G06F 1/203 |
| | | | | 136/201 |
| 2016/0262028 A1* | 9/2016 | Reddy | .................... | G06F 1/1698 |
| 2016/0292988 A1* | 10/2016 | McCleary | ............... | G08B 21/14 |
| 2016/0306328 A1* | 10/2016 | Ko | ........................... | G04C 17/00 |
| 2016/0317060 A1* | 11/2016 | Connor | ................. | G01J 3/0294 |
| 2016/0327915 A1* | 11/2016 | Katzer | .................... | G04B 19/04 |
| 2016/0363914 A1* | 12/2016 | Kim | ........................ | G06F 3/015 |
| 2017/0007008 A1* | 1/2017 | Pascale | ..................... | A45F 3/00 |
| 2017/0026610 A1* | 1/2017 | Kwon | ................... | H04N 5/9202 |
| 2017/0032168 A1* | 2/2017 | Kim | ........................ | G06F 3/0414 |
| 2017/0068225 A1* | 3/2017 | Chen, Jr. | ................. | G04G 19/00 |
| 2017/0201611 A1* | 7/2017 | Donley | ............... | H04M 1/7253 |
| 2017/0216668 A1* | 8/2017 | Burton | ............... | A63B 71/0622 |
| 2017/0222681 A1* | 8/2017 | Deokar | ................ | H04B 1/3888 |
| 2018/0020193 A1* | 1/2018 | Blum | ..................... | G06F 1/1686 |
| 2018/0181733 A1* | 6/2018 | Shim | ..................... | G04G 21/08 |

(Continued)

*Primary Examiner* — Fekadeselassie Girma
(74) *Attorney, Agent, or Firm* — McLean Law LLC; Kimberly McLean, Esq.

(57) ABSTRACT

A safety wearable device including a band, a controller chip, an acknowledgment button and a display screen. The band is configured to be worn around a wearer's wrist and the band includes a first strap member and a second strap member. The first strap member includes a plurality of apertures and the second strap member includes a ring and a closure fastener mechanism. The first strap member threads through the ring of the second strap member so that one of the plurality of apertures is received by the closure fastener mechanism to securely attach the band to the wearer's wrist. The controller chip is attached to the band for transmitting and receiving signals and the controller chip includes a vibrating mechanism to notify the wearer when an incoming message has been received. The acknowledgment button is attached to the controller chip and an acknowledgment signal is transmitted from the device when the acknowledgment button is depressed. The display screen for displaying messages received at the device.

9 Claims, 1 Drawing Sheet

(56) References Cited

U.S. PATENT DOCUMENTS

| | | | | |
|---|---|---|---|---|
| 2018/0196396 A1* | 7/2018 | Cho | ........................ | G04C 10/00 |
| 2018/0310847 A1* | 11/2018 | Ornato | ............... | A61B 5/02427 |
| 2018/0364557 A1* | 12/2018 | Park | ........................ | G04G 21/00 |
| 2019/0204790 A1* | 7/2019 | Kim | ..................... | G02B 6/0068 |

* cited by examiner

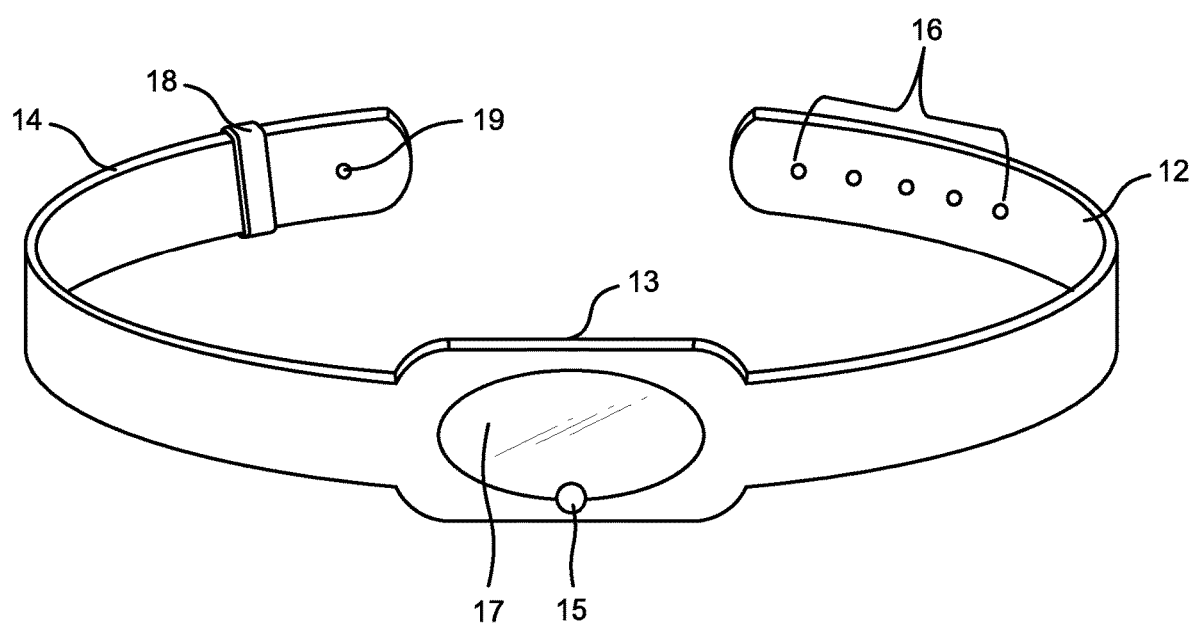

SAFETY WEARABLE DEVICE

FIELD OF THE INVENTION

Embodiments described herein generally relate to a wearable device, and more particularly to a safety wearable device.

BACKGROUND OF THE INVENTION

As every parent knows, it's a dangerous world out there. For parents worried about their children's safety, technological assistance to make sure children are safe when they are out in the world is a necessity. Hence, it is desirable to provide an innovative technological device to assist parents in ensuring their children's safety.

BRIEF DESCRIPTION OF THE DRAWINGS

The various advantages of the embodiments of the present disclosure will become apparent to one skilled in the art by reading the following specification and appended claims, and by referencing the following drawings, in which:

FIG. 1 shows an exemplary view of a safety wearable device according to an embodiment of the present disclosure.

SUMMARY OF THE INVENTION

Exemplary embodiments disclosed herein describe a safety wearable device including a band, a controller chip, an acknowledgment button and a display screen. The band is configured to be worn around a wearer's wrist and the band includes a first strap member and a second strap member. The first strap member includes a plurality of apertures and the second strap member includes a ring and a closure fastener mechanism. The first strap member threads through the ring of the second strap member so that one of the plurality of apertures is received by the closure fastener mechanism to securely attach the band to the wearer's wrist. The controller chip is attached to the band for transmitting and receiving signals and the controller chip includes a vibrating mechanism to notify the wearer when an incoming message has been received. The acknowledgment button is attached to the controller chip and an acknowledgment signal is transmitted from the device when the acknowledgment button is depressed. The display screen for displaying messages received at the device.

In some exemplary embodiments, an incoming message may request the wearer to confirm their safety.

In some exemplary embodiments, the wearer depresses the acknowledgment button to send an acknowledgment signal indicating that the wearer is safe to the requester in response to receiving a confirm safety request.

In some exemplary embodiments, the band is configurable to have an adjustable size.

In some exemplary embodiments, the band includes rubber grip material to provide a non-slip connection between the wearer's bare skin and the surface of the band in contact with the wearer's skin.

In some exemplary embodiments, the device is battery operated.

In some exemplary embodiments, the band is waterproof.

In some exemplary embodiments, the controller chip is waterproof.

In some exemplary embodiments, the closure fastener mechanism is a clasp.

In some exemplary embodiments, the closure fastener mechanism is a buckle.

In some exemplary embodiments, the device includes Bluetooth technology for pairing with other devices.

DETAILED DESCRIPTION

The present disclosure relates to a safety wearable device 10. The device is battery operated and is worn on a wearer's wrist. The device allows the wearer to inform a remote requester that the wearer is safe by triggering the transmission of an acknowledgment signal to the remote requester by depressing an acknowledgment button on the device. In another exemplary embodiment, the device 10 is chargeable.

As illustrated in FIG. 1, the device 10 includes a band, a controller chip 13, an acknowledgment button 15, and a display screen 17. The band includes a first strap member 12 and a second strap member 14. The first strap member includes a plurality of apertures 16. The second strap member includes a ring 18 and a closure fastener mechanism 19.

A wearer may securely attach the band to their wrist by threading the first strap member 12 through the ring 18 of the second strap member 14 until one of the apertures 16 is placed in connection with the closure fastener mechanism 19. The wearer connects a particular aperture with the closure fastener mechanism so as to achieve a desired size of the band. The band size is adjustable by connecting the closure fastener mechanism to different apertures on the first strap member.

The closure fastener mechanism 19 may be any suitable fastener, such as, for example, a buckle or clasp. In a preferred embodiment, the closure fastener mechanism is a clasp. The ring 18 is made of any suitable material, such as, for example, rubber. The band may be made of any suitable waterproof material. In a preferred embodiment, the band is made of waterproof rubber and the band includes rubber grip material to provide a non-slip connection between the wearer's bare skin and the surface of the band which is in direct contact with the wearer's skin.

The controller chip 13 is waterproof and is attached to the band. The controller chip may be attached to the band by mounting the controller chip to a front surface of the band. The band may include a cut-out on its front surface to receive the controller chip. In another exemplary embodiment, the first strap member 12 and the second strap member 14 may be fixedly attached to each side of the controller chip, thereby creating a watch-like structure.

The controller chip 13 includes a transmitter and receiver for transmitting and receiving signals, and a vibrating mechanism for vibrating the device to notify the wearer that an incoming message has been received. The vibrating mechanism may be implemented using any suitable vibrators, such as a vibrating motor. The controller chip also includes Bluetooth technology to enable the device 10 to pair with other devices so that the devices may exchange messages with one another. The controller chip is operatively coupled to the display screen 17 and the acknowledgment button 15.

The acknowledgment button 15 may be attached to the controller chip 13. The acknowledgment button is a push button mechanism that is activated (i.e. depressed) by the wearer when the wearer wants to send an acknowledgment signal to a remote requester. When the wearer activates the button, an alert is sent to the controller chip.

The display screen 17 may be attached to the controller chip 13 and receives messages from the controller chip to display on the display screen. The display screen may be any suitable display, such as, a liquid crystal display (LCD). The display screen may also include a touch screen user interface for receiving inputs from the user/wearer.

In operation, for example, a remote requester may download an app from an app store to a Bluetooth enabled smartphone to communicate with the device. The app will allow the remote requester to send and receive messages to and from the device 10 using Bluetooth. When the controller chip 13 receives an incoming signal from the remote requester, the controller chip will trigger the vibrating mechanism and the data/message corresponding to the received signal will be displayed on the display screen 17. The message may state, for example, "Please confirm your safety". The vibrating mechanism will cause the wearer to visually inspect the screen, and thereafter, the wearer will depress the acknowledgment button 15 to notify the remote requester that the wearer is safe. The controller chip will transmit the acknowledgment signal to the remote requester upon receiving an alert that the acknowledgment button was depressed.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A safety wearable device comprising:
    a band configured to be worn around a wearer's wrist, the band including a first strap
    member and a second strap member, the first strap member including a plurality of apertures, the second strap member including a ring and a closure fastener mechanism, wherein the first strap member threads through the ring of the second strap member so that one of the plurality of apertures is received by the closure fastener mechanism to securely attach the band to the wearer's wrist;
    a controller chip attached to the band for transmitting and receiving signals, the controller chip including a vibrating mechanism to notify the wearer when an incoming message has been received, and wherein the controller chip transmits an acknowledgment signal to a remote requester upon depressing of an acknowledgment button;
    the acknowledgment button is attached to the controller chip, and the wearer depresses the acknowledgment button to send an acknowledgment signal indicating that the wearer is safe to the remote requester in response to receiving a confirm safety request from the requester; and
    a display screen for displaying messages received at the device.

2. The device of claim 1, wherein the band is configurable to have an adjustable size.

3. The device of claim 1, wherein the band includes rubber grip material to provide a non-slip connection between the wearer's bare skin and the surface of the band in contact with the wearer's skin.

4. The device of claim 1, wherein the device is battery operated.

5. The device of claim 1, wherein the band is waterproof.

6. The device of claim 1, wherein the controller chip is waterproof.

7. The device of claim 1, wherein the closure fastener mechanism is a clasp.

8. The device of claim 1, wherein the closure fastener mechanism is a buckle.

9. The device of claim 1, wherein the device includes Bluetooth technology for pairing with other devices.

* * * * *